J. G. ROGERS.
Car-Coupling.

No. 164,487.

Patented June 15, 1875.

WITNESSES:

INVENTOR: John G. Rogers
BY Munn & Co
ATTORNEYS.

THE GRAPHIC CO.PHOTO-LITH.39 & 41 PARK PLACE,N.Y.

UNITED STATES PATENT OFFICE.

JOHN G. ROGERS, OF VICTORIA, MISSOURI.

IMPROVEMENT IN CAR-COUPLINGS.

Specification forming part of Letters Patent No. 164,487, dated June 15, 1875; application filed April 3, 1875.

*To all whom it may concern:*

Figure 1:
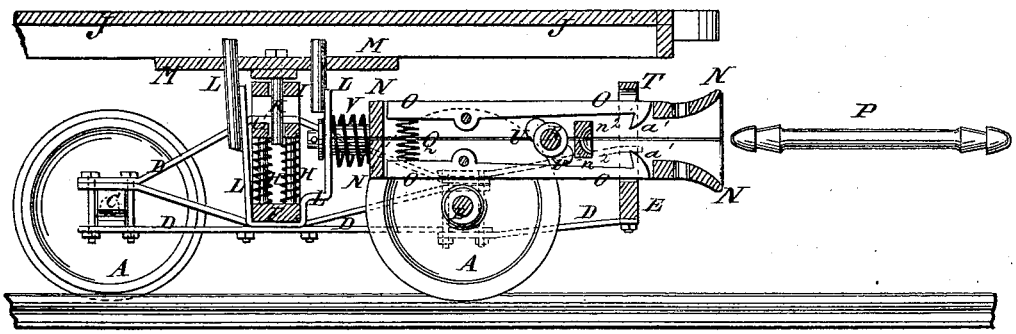
Figure 2:
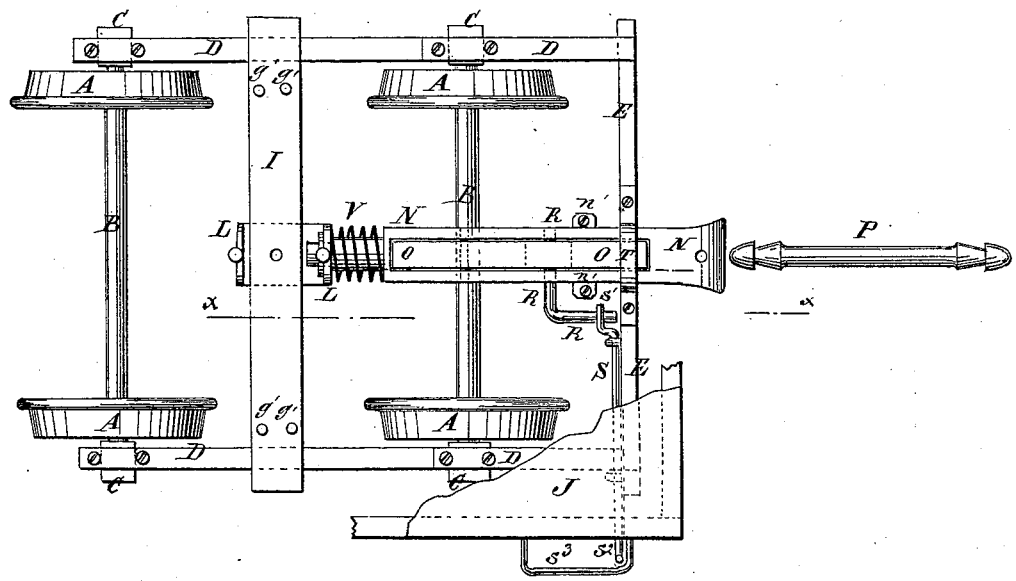

Be it known that I, JOHN G. ROGERS, of Victoria, in the county of Jefferson and State of Missouri, have invented a new and useful Improvement in Car-Coupling, of which the following is a specification:

Figure 1 is a side view of a car-truck, to which my improvement has been applied, partly in section, through the line $x\,x$, Fig. 2. Fig. 2 is a top view of the same.

Similar letters of reference indicate corresponding parts.

The invention will first be described in connection with the drawing, and then pointed out in the claim.

A are the truck-wheels, which are rigidly connected with the axles B. The journals of the axles B revolve in the journal-boxes C, attached to the side frames D of the truck. The ends of the side frames D project at the forward end of the truck, and to them are attached the ends of a cross-bar, E.

To the lower middle part of the side frames D are attached the ends of a cross-bar, F. In the upper middle parts of the side frames D is placed a cross-bar, G, which is kept in place by guide-pins attached to the bar F, and is supported by springs H, interposed between the said bars F G. I is a bar placed above the bar G, with which it is connected by short studs $g'$. The ends of the bar I project above the top bars of the side frames D, so that the vertical play of the car-body is limited by the two bars G I. The car-body J is connected with the bars G I by the king-bolt K, and with the bar F by the U-shaped bar L, the bend of which is secured to the lower side of the said bars F. The arms of the U-bar L pass up across the opposite edges of the bars F G I, and their ends enter curved slots in a plate, M, attached to the car-body J, so that the truck may have sufficient play for passing around curves, while the upper ends of the said arms are all the time firmly supported.

In the forward arm of the U-bar L is formed a hole to receive the rounded rear end of the bumper N, where it is secured by a pin or other suitable fastening. The bumper N is made in two parts, the plane of division passing horizontally through its center. The parts of the bumper N have lugs $n'$ formed upon the adjacent edges of their sides, so that they can be securely bolted together. The mouth of the bumper N is made flaring to guide the coupling-bar into place. The upper and lower sides of the bumper N are slotted to receive the hook-levers O, which are pivoted toward their rear ends to the said bumper N. The forward ends of the lever-hooks O abut against the solid head of the bumper N, and upon the lower side of said forward ends are formed hooks or jaws $o'$, which are concaved to fit upon the neck of the coupling-bar P, and sustain the draft-strain.

The coupling-bar P is a solid straight bar, with a conical head upon each end, so that when the cars are run together the said head may open the jaws $o'$ of the hook-levers O and pass beyond them, coupling the cars.

The inner ends of the hook-levers O are held apart, pressing their jaws $o'$ toward each other to grasp the coupling-bar P, by a spring, Q, interposed between said inner ends. Upon the inner sides of the parts of the bumper N are cast projections or blocks $n^1$ for the end of the coupling-bar P to strike against, to keep said bar P from being pushed too far in. The forward side of the stop-blocks $n^2$ is concaved to receive the end of the coupling-bar P, and hold it in the center of the cavity of the bumper, and also to support the coupling-bar in a horizontal position, so as to enter the bumper of the adjacent car as the cars are run together.

The forward ends of the lever hooks O are forced apart, to release the coupling-bar P, by a cross-head or double cam, U, interposed between them, and rigidly attached to the crank-shaft R, that passes transversely through the bumper N. S is a shaft, upon the inner end of which is formed a small crank, $s^1$, which rests upon the crank-arm of the shaft R. To the outer end of the shaft S is attached a lever or arm, $s^2$, which projects upward through a keeper, $s^3$, attached to the car-body, into such a position that the brakeman, while applying the brake, can easily reach and operate it to uncouple the cars. This enables the brakeman to conveniently cut off any desired part of the train without leaving his position.

The bumper N is held down upon the bar E by a strap or keeper, T, attached to said bar, and which passes over said bumper. Upon the round rear part of the bumper N is placed a spring, V, the forward end of which rests against the shoulder of the bumper N, and its rear end rests against the forward arm of the U-bar L. The elasticity of the spring V diminishes the shock as the cars are run together.

By this construction the bumper N is connected with the truck-frame below the car-springs, and will thus be always at the same height, and will be entirely unaffected by the weight of the loading placed upon the car. In the forward part of the bumper N is formed a hole to receive a coupling-pin, so that a car with my improved coupling can be coupled with a car provided with an ordinary coupling.

Having thus described my invention, I claim as new and desire to secure by Letters Patent—

The combination of the bumper N and U-bar L with the front cross-bar E and the central stationary cross-bar F of the truck-frame, substantially as herein shown and described.

JOHN G. ROGERS.

Witnesses:
ALBERT M. TYLER,
FRANK S. MITCHELL.